United States Patent
Van der Auwera et al.

(10) Patent No.: US 9,756,327 B2
(45) Date of Patent: Sep. 5, 2017

(54) QUANTIZATION MATRIX AND DEBLOCKING FILTER ADJUSTMENTS FOR VIDEO CODING

(71) Applicant: QUALCOMM Incorporated, San Diego, CA (US)

(72) Inventors: Geert Van der Auwera, San Diego, CA (US); Rajan Laxman Joshi, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 611 days.

(21) Appl. No.: 13/793,942

(22) Filed: Mar. 11, 2013

(65) Prior Publication Data
US 2013/0259120 A1    Oct. 3, 2013

Related U.S. Application Data

(60) Provisional application No. 61/619,820, filed on Apr. 3, 2012, provisional application No. 61/637,542, filed on Apr. 24, 2012.

(51) Int. Cl.
*H04N 7/26* (2006.01)
*H04N 7/32* (2006.01)
(Continued)

(52) U.S. Cl.
CPC ..... *H04N 19/00096* (2013.01); *H04N 19/117* (2014.11); *H04N 19/126* (2014.11);
(Continued)

(58) Field of Classification Search
CPC .......... H04N 19/00096; H04N 19/117; H04N 19/126; H04N 19/157; H04N 19/176; H04N 19/86
(Continued)

(56) References Cited

U.S. PATENT DOCUMENTS 7,167,522 B2 * 1/2007 Webb ................... H04N 19/174
375/240.29
8,150,187 B1    4/2012 Winger et al.
(Continued)

FOREIGN PATENT DOCUMENTS

CN    101222645 A    7/2008
CN    102057676 A    5/2011
(Continued)

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.
(Continued)

*Primary Examiner* — Jorge L Ortiz Criado
*Assistant Examiner* — Yong Joon Kwon

(57) ABSTRACT

A device may include a video coder to determine an equivalent quantization parameter (QP) for a decoded block of video data using a quantization matrix for the decoded block of video data, determine deblocking parameters based on the determined equivalent QP, and deblock an edge of the decoded block based on the determined deblocking parameters. In particular, the video coder may determine equivalent QPs for two neighboring blocks defining a common edge, and deblock the common edge based on the equivalent QPs. The video coder may determine deblocking parameters, such as $\beta$ and $t_c$ values, based on the equivalent QPs. The video coder may then deblock the common edge based on the deblocking parameters, e.g., determine whether to deblock the common edge, determine whether to apply a strong or a weak filter to the common edge, and determine a width (in number of pixels) for a weak filter.

43 Claims, 7 Drawing Sheets

(51) Int. Cl.
*H04N 19/126* (2014.01)
*H04N 19/176* (2014.01)
*H04N 19/117* (2014.01)
*H04N 19/157* (2014.01)
*H04N 19/86* (2014.01)

(52) U.S. Cl.
CPC ......... *H04N 19/157* (2014.11); *H04N 19/176* (2014.11); *H04N 19/86* (2014.11)

(58) Field of Classification Search
USPC .................................................. 375/240.03
See application file for complete search history.

(56) References Cited

U.S. PATENT DOCUMENTS

| | | | |
|---|---|---|---|
| 8,655,087 B2 | 2/2014 | Yamada et al. | |
| 8,743,972 B2* | 6/2014 | Dong | H04N 19/159 375/240.12 |
| 8,948,268 B2* | 2/2015 | Kim | G06T 9/005 375/240.05 |
| 2005/0190836 A1* | 9/2005 | Lu | H04N 19/176 375/240.03 |
| 2005/0243912 A1* | 11/2005 | Kwon | H04N 19/159 375/240.03 |
| 2006/0133479 A1* | 6/2006 | Chen | H04N 19/172 375/240.03 |
| 2008/0199090 A1* | 8/2008 | Tasaka | H04N 19/139 382/233 |
| 2008/0317377 A1* | 12/2008 | Saigo | H04N 9/045 382/274 |
| 2009/0148054 A1* | 6/2009 | Kim | H04N 19/61 382/232 |
| 2009/0257664 A1* | 10/2009 | Kao | H04N 19/159 382/232 |
| 2009/0304086 A1 | 12/2009 | Shi et al. | |
| 2009/0310677 A1* | 12/2009 | Shiodera | H04N 19/70 375/240.15 |
| 2011/0176606 A1* | 7/2011 | Fuchie | H04N 19/176 375/240.05 |
| 2011/0200266 A1* | 8/2011 | Fuchie | H04N 19/176 382/251 |
| 2011/0261880 A1* | 10/2011 | Auyeung | H04N 19/105 375/240.12 |
| 2012/0140814 A1 | 6/2012 | Sole Rojals et al. | |
| 2013/0077682 A1* | 3/2013 | Han | H04N 19/00569 375/240.12 |
| 2013/0101025 A1* | 4/2013 | Van der Auwera | H04N 19/176 375/240.03 |
| 2013/0259141 A1* | 10/2013 | Van der Auwera | H04N 19/117 375/240.29 |
| 2014/0036998 A1* | 2/2014 | Narroschke | H04N 19/0089 375/240.03 |
| 2016/0337658 A1 | 11/2016 | Min et al. | |

FOREIGN PATENT DOCUMENTS

| | | |
|---|---|---|
| JP | 2008182562 A | 8/2008 |
| WO | 2011129619 A3 | 2/2012 |
| WO | 2012153538 A1 | 11/2012 |

OTHER PUBLICATIONS

Bross, et al., High Efficiency Video Coding (HEVC) text specification draft 10 (for FDIS & Last Call), Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, Document JCTVC-L1003_v34, 310 pages.

Wiegand et al., "WD3: Working Draft 3 of High-Efficiency Video Coding," Document JCTVC-E603, 5th Meeting: Geneva, CH, Mar. 16-23, 2011, 193 pp.

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, 290 pp.

Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, Se, Jul. 11-20, 2012, JCTVC-J1003_d7, pp. 261.

Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1003_v7, pp. 290.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

International Search Report and Written Opinion—PCT/US2013/030466—ISA/EPO—May 28, 2013, 13 pp.

ITU-T H.264, Series H: Audiovisual and Multimedia Systems, Infrastructure of audiovisual services—Coding of moving video, Advanced video coding for generic audiovisual services, Mar. 2010, 674 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Nath Vijay Kumar et al., "Blocking artifacts suppression in Wavelet transform domain using local Wiener filtering", 3rd National Conference on Emerging Trends and Applications in Computer Science (NCETACS), Mar. 30, 2012, pp. 93-97.

Sato (Sony) K: "On Deblocking Filter and DC Component of Quantization Matrices", 101. MPEG Meeting; Stockholm; (Motion Picture Expert Group or ISO/IEC JTC1/SC29/VVG11), No. m25512, Jul. 11, 2012, 6 pp.

Van Der Auwera G et al., "AHG6: Quantization Matrices and Deblocking Filtering", MPEG Meeting; Geneva; (Joint Collaborative Team on Video Coding of ISO/IEC JTC1/SC29/WG11 and ITU-T SG.16), No. JCTVC-I0280, Apr. 17, 2012, 7 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Response to Written Opinion dated May 28, 2013, from International Application No. PCT/US2013/030466, filed on Nov. 20, 2013, 6 pp.

Second Written Opinion from International Application No. PCT/US2013/030466, dated Mar. 3, 2014, 6 pp.

Response to Written Opinion dated Mar. 3, 2014, from International Application No. PCT/US2013/030466, filed on May 1, 2014, 5 pp.

International Prelminary Report on Patentability from International Application No. PCT/US2013/030466, dtaed Jun. 11, 2014, 8 pp.

Van Der Auwera, et al., "AHG6: Quantization Matrices and Deblocking Filtering," Joint Collaborative Team on Video Coding (JCT-VC), of ITU-T SG 16 WP 3 and ISO/IEC JTC 1/SC 29/WG 11, 9th Meeting: Geneva, CH, Apr. 27-May 7, 2012, Document: JCTVC-I0280r1, Apr. 25, 2012; 10 pp.

* cited by examiner

QUANTIZATION MATRIX AND DEBLOCKING FILTER ADJUSTMENTS FOR VIDEO CODING

This application claims the benefit of U.S. Provisional Application Ser. No. 61/619,820, filed Apr. 3, 2012, and U.S. Provisional Application Ser. No. 61/637,542, filed Apr. 24, 2012, the entire contents of each of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to deblocking blocks of video data. That is, block-based video coding techniques can sometimes lead to "blockiness" artifacts, where boundaries between individually coded blocks can be perceived. Such artifacts can arise when blocks are coded at different quality levels. An amount of quantization applied to a block (as indicated by a quantization parameter (QP)) can directly impact the quality of the block. Therefore, deblocking techniques typically take account of the QP of the block, e.g., when determining whether to deblock an edge of the block and how to deblock the edge. Recently, quantization matrices have been used to modify the amount of quantization that is applied to a block. This disclosure proposes calculating an "equivalent QP" that is based at least in part on the quantization matrix for the block, and using the equivalent QP when making deblocking decisions for the block.

In one example, a method includes determining an equivalent quantization parameter (QP) for a decoded block of video data using a quantization matrix for the decoded block of video data, determining deblocking parameters based on the determined equivalent QP, and deblocking an edge of the decoded block based on the determined deblocking parameters.

In another example, a device includes a video coder configured to determine an equivalent quantization parameter (QP) for a decoded block of video data using a quantization matrix for the decoded block of video data, determine deblocking parameters based on the determined equivalent QP, and deblock an edge of the decoded block based on the determined deblocking parameters.

In another example, a device includes means for determining an equivalent quantization parameter (QP) for a decoded block of video data using a quantization matrix for the decoded block of video data, means for determining deblocking parameters based on the determined equivalent QP, and means for deblocking an edge of the decoded block based on the determined deblocking parameters.

In another example, a computer-readable storage medium has stored thereon instructions that, when executed, cause a processor to determine an equivalent quantization parameter (QP) for a decoded block of video data using a quantization matrix for the decoded block of video data, determine deblocking parameters based on the determined equivalent QP, and deblock an edge of the decoded block based on the determined deblocking parameters.

The details of one or more examples are set forth in the accompanying drawings and the description below. Other features, objects, and advantages will be apparent from the description and drawings, and from the claims.

DETAILED DESCRIPTION

Figure 1:
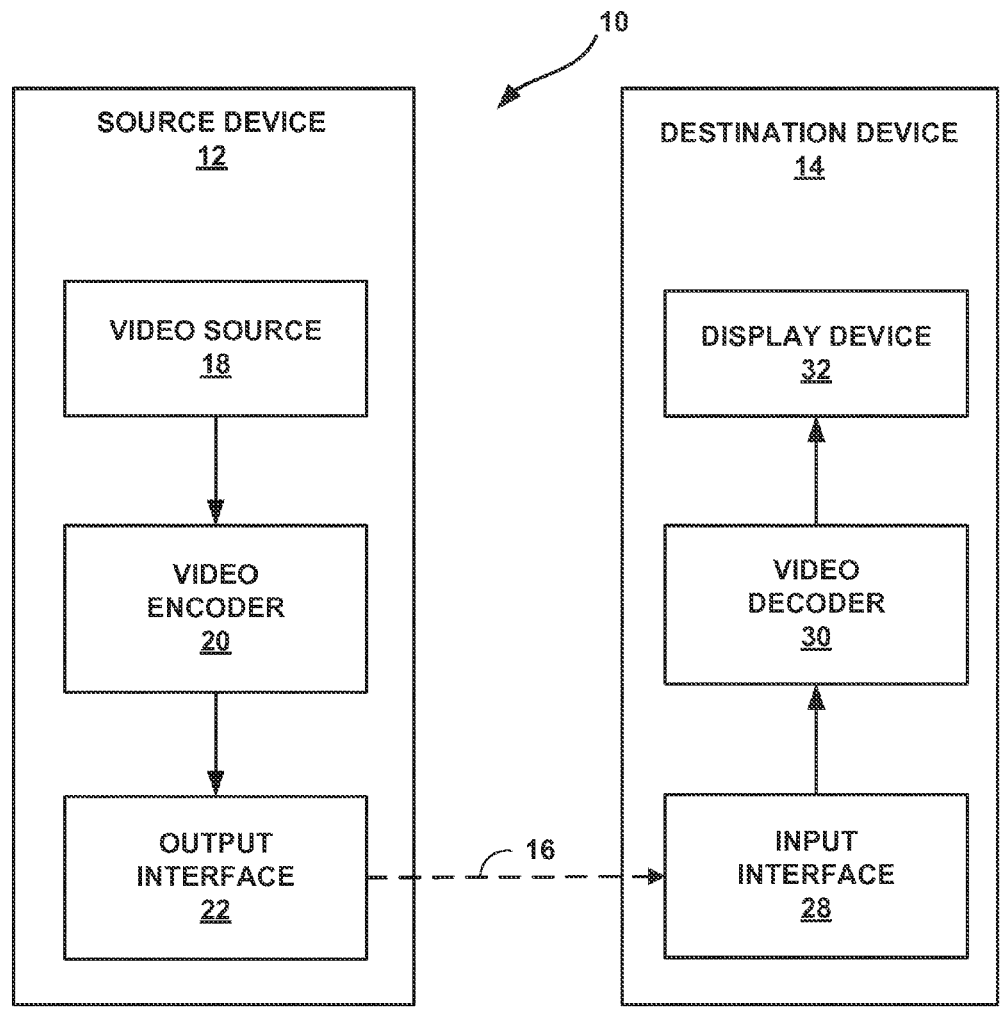
FIG. 1 is a block diagram illustrating an example video encoding and decoding system that may utilize techniques for deblocking an edge between video blocks.

Video coders, such as video encoders and video decoders, are generally configured to code individual pictures of a sequence of pictures using either spatial prediction (or intra-prediction) or temporal prediction (or inter-prediction). More particularly, video coders may predict blocks of a picture using intra-prediction or inter-prediction. Video coders may code residual values for the blocks, where the residual values correspond to pixel-by-pixel differences between a predicted block and an original (that is, uncoded) block. Video coders may transform a residual block to convert values of the residual block from a pixel domain to a frequency domain. Moreover, video coders may quantize transform coefficients of the transformed residual block using a particular degree of quantization indicated by a quantization parameter (QP).

In some cases, block-based coding in this manner may lead to blockiness artifacts between blocks of the picture. Therefore, video coders may perform various deblocking procedures to remove the blockiness artifacts. In general, deblocking involves two steps: determining whether a particular edge that occurs between two blocks should be deblocked, and then deblocking edges that are determined should be deblocked. The deblocking process is influenced by a boundary filtering strength value, also referred to in this disclosure as a deblocking strength. Beta (β) and $t_c$ values may be used to determine filtering strength and coefficients used for deblocking decisions, e.g., whether to deblock an edge and, after determining to deblock the edge, a type of filter to use (e.g., strong or weak) and a width of the filter, if a weak filter is selected.

The deblocking procedure may take account of QP values for blocks when deblocking an edge that occurs between two blocks. For example, β and $t_c$ may depend on the value of QP. The High Efficiency Video Coding (HEVC) committee draft (CD), as an example, supports the signaling of scaling or quantization matrices (Q-matrices) in an adaptation parameter set (APS) per transform size, color component, and intra/inter mode. Let M[i][j] represent elements from the array corresponding to one of the Q-matrices. The value range of M[i][j] may be 1 to 255 (8-bit) with the value 16 representing no change to the quantization for frequency index (i, j). Table 1 below enumerates the equivalent QP change, in the example of the HEVC CD, in case the normalized value of M[i][j]/16 doubles or halves, which corresponds to the doubling or halving of the quantization step size, or equivalently, a QP change of +6 or −6. Intermediate values are also allowed.

TABLE 1

| M[i][j]/16 | QP Change |
| --- | --- |
| 1/16 | −24 |
| 1/8 | −18 |
| 1/4 | −12 |
| 1/2 | −6 |

TABLE 1-continued

| M[i][j]/16 | QP Change |
| --- | --- |
| 1 | 0 |
| 2 | +6 |
| 4 | +12 |
| 8 | +18 |
| 16 | +24 |

Any Q-matrix can be signaled that significantly increases the QP per transform size and frequency. One potential problem of this is that the deblocking filter in the example of HEVC does not receive this quantization matrix information. In accordance with the techniques of this disclosure, some adjustment may be performed. This adjustment can be accomplished by signaling deblocking strength control parameters, as is supported by HEVC. The reasoning is that if a video encoder tunes the subjective quality, then the deblocking filter should be tuned in the same manner. A video coder conforming to HEVC may need to automatically adjust the deblocking strength based on some computation of an "equivalent QP" based on the Q-matrix per transform unit (TU) size, in some examples. The "equivalent QP" represents a change to the QP signaled for a block, e.g., using the Q-matrix. Thus, the equivalent QP may differ from the QP signaled for the block. This disclosure describes various techniques for adjusting deblocking characteristics, such as deblocking strength, based on an equivalent QP, as discussed in greater detail below. In general, an equivalent QP takes account of variation in quantization between blocks based on, e.g., a quantization matrix.

FIG. 1 is a block diagram illustrating an example video encoding and decoding system 10 that may utilize techniques for deblocking an edge between video blocks. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for deblocking an edge between video blocks. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for deblocking an edge between video blocks may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

In addition, video encoder 20 may decode encoded pictures, e.g., by inverse quantizing and inverse transforming residual data, and combine the residual data with prediction data. In this manner, video encoder 20 can simulate the decoding process performed by video decoder 30. Both video encoder 20 and video decoder 30, therefore, will have access to substantially the same decoded pictures for use as prediction. In addition, video encoder 20 and video decoder 30 may be configured to perform an "in-loop" deblocking process, in accordance with the techniques of this disclosure. The deblocking process may be performed "in loop" in the sense that the deblocking filtered pictures may be used as reference pictures for subsequently coded pictures (e.g., pictures coded using inter-prediction).

As discussed above, the deblocking process may take account of quantization parameters for two neighboring blocks that form an edge (that is, a common boundary between the two blocks). Video encoder 20 and video decoder 30 may essentially perform the same in-loop deblocking filtering process. The techniques as described below are generally described with respect to video encoder 20. However, it should be understood that substantially similar techniques may be performed by video decoder 30. The term "video coder" may be used generally to refer to either a video encoder (such as video encoder 20) or a video decoder (such as video decoder 30). Likewise, the term "video coding" may refer to video encoder or video decoding.

To adjust the deblocking filter strength for a current edge in between two video blocks (blocks P and Q, for example) based on Q-matrix QP changes for blocks P and Q, the deblocking filter of video encoder 20 may first determine the sizes of the TUs that contain the two video blocks (P and Q), as well as the color component and intra/inter mode. Based on this information, video encoder 20 may determine the quantization matrices (also referred to herein as "Q-matrices") that correspond to video blocks P and Q. If the TU size cannot be determined for video block P or Q (for example, in skip mode), then video encoder 20 may determine that no QP change for that video block is available. In the example discussed above, it is assumed that blocks P and Q directly neighbor each other (e.g., side-by-side or above and below), and form a common edge, which can be deblocked.

In one example, video encoder 20, executing the deblocking filter, adjusts the deblocking parameters (e.g., through a table look-up of β and $t_C$ parameters) based on an "equivalent QP." Video encoder 20 may calculate the "equivalent QP" for either or both blocks in advance per set of quantization matrices signaled in a data structure, e.g., the APS, and may be updated when the Q-matrices are modified through signaling. For example, video encoder 20 may determine that the Q-matrices are to be updated and signal updates to the Q-matrices in a new data structure, e.g., a new APS, and also update the equivalent QP. Likewise, video decoder 30 may receive updates to Q-matrices from a data structure, such as an APS, and update the Q-matrices as well as equivalent QP values accordingly. Although an APS is described above as one example of a data structure for signaling Q-matrices, other data structures may also be used to signal Q-matrix data, such as, for example, sequence parameter sets (SPSs), picture parameter sets (PPSs), slice headers, supplemental enhancement information (SEI) messages, or the like.

This disclosure provides various alternative methods to determine the equivalent QP. As one example, for P and Q blocks, video encoder 20 may use the respective M[0][0] (DC component) to determine the QP change based on a look-up table (similar to Table 1, above) or based on a mathematical relationship between M[i][j] and the QP change. The respective QP changes may be applied to the $QP_Y$ (luma QP) values of the video blocks P and Q. The average of the $QP_Y$ values for two neighboring blocks ($QP_L$) may indicate the deblocking parameters, to be applied by video encoder 20 (or other video coder, e.g., a video coder in compliance with HEVC).

As another example, video encoder 20 may compute the average, maximum, or any mathematical or statistical relationship, based on all M[i][j] elements per Q-matrix, and determine the QP changes for video blocks P and Q based on this relationship.

As another example, video encoder 20 may compute the average, maximum, or any mathematical or statistical relationship, based on a restricted (i, j) index range or frequency zone (for example, low frequencies) of the M[i][j] elements per Q-matrix. Video encoder 20 may then determine the QP changes for video blocks P and Q based on this relationship.

As another example, video encoder 20 may compute the average, maximum, or any mathematical or statistical relationship, based on all the M[i][j] elements from all Q-matrices (all transform sizes and/or all color components and/or inter mode and/or intra mode), and determine the QP changes for video blocks P and Q based on this relationship.

As another example, video encoder 20 may compute the average, maximum, or any mathematical or statistical relationship, based on a restricted (i,j) index range or frequency zone (for example low frequencies) of the M[i][j] elements from all Q-matrices (all transform sizes and/or all color components and/or inter mode and/or intra mode), and determine the QP changes for video blocks P and Q based on this relationship.

These examples may, in some examples, increase the complexity of the deblocking filter in video encoder 20 and video decoder 30, and may cause video encoder 20 and video decoder 30 to buffer additional information indicating TU sizes along largest coding unit (LCU) boundaries. Nevertheless, this increased complexity may serve to provide a better viewing experience for a user.

As another example, video encoder 20 may compute deblocking offset parameter values, which may be transform size dependent, and video encoder 20 may signal these values to video decoder 30. These offset parameters may represent an offset that is added to the $QP_L$ value of the current edge. Video encoder 20 (and, likewise, video decoder 30) may use the resulting index Q to lookup β and/or $t_C$ parameters in a look-up table. Video encoder 20 may apply the techniques described above to determine one "equivalent QP" value or multiple "equivalent QP" values depending on TU sizes, and/or color component and/or intra/inter mode. Subsequently, video encoder 20 may determine the β and/or $t_C$ deblocking offset parameter values to be signaled, for example, as the difference between the $QP_L$ value of the current edge and the "equivalent QP" as appropriately scaled to save bits. The β and/or $t_C$ deblocking offset parameters may be signaled per transform size (4×4 up to 32×32) or a linear or nonlinear relationship can be determined between the parameters. In the linear case, video encoder 20 may signal the slope as a parameter, and video decoder 30 may determine the slope from the signaled parameter.

In this example, video encoder 20 may apply the offsets to the $QP_L$ value of the current edge, which is the average of the $QP_Y$ (luma QP) values of the neighboring video blocks P and Q, which may correspond to different TU sizes. Therefore, determining the "equivalent QP" may also depend on all possible combinations of neighboring TU sizes, per color component, and per intra/inter mode. Therefore, the number of offsets may be very large.

In yet another example, video encoder 20 may determine the "equivalent QP" according to the techniques described above. This means that there potentially is one "equivalent QP" per TU size, color component and intra/inter mode, according to the Q-matrix signaling options specified in HEVC. In this example, video encoder 20 may signal the "equivalent QP" values together with the Q-matrices in the APS (see Table 2) or alternatively, together with the deblocking parameters in the APS (see Table 3). Again the APS is described for purposes of example; other data structures, such as SPSs, PPSs, slice headers, or SEI messages, may be used. Table 2 below provides example syntax for a scaling list parameter and proposed scaling list (Q-matrix) parameters for deblocking adjustment. Table 3 provides example syntax for an adaptation parameter set with proposed scaling list (Q-matrix) deblocking adjustment parameters. Alternatively, video encoder 20 may signal the "equivalent QP" values in a sequence parameter set (SPS), a picture parameter set (PPS), an adaptation parameter set (APS), a slice header, or other similar data structure.

TABLE 2

| scaling_list_param( ) { | Descriptor |
|---|---|
|   scaling_list_present_flag | u(1) |
|   if( scaling_list_present_flag ) | |
|     for( sizeID = 0; sizeID < 4; sizeID++ ) | |
|       for( matrixID = 0; matrixID < (sizeID = = 3) ? 2 : 6; matrixID++ ) { | |
|         scaling_list_pred_mode_flag | u(1) |
|         if( !scaling_list_pred_mode_flag ) | |
|           scaling_list_pred_matrix_id_delta | ue(v) |
|         Else | |
|           scaling_list( ScalingList[ sizeID ][ matrixID ], sizeID , matrixID ) | |
|       } | |
|   scaling_list_deblocking_flag | u(1) |
|   if ( scaling_list_deblocking_flag ) | |
|     for( sizeID = 0; sizeID < 4; sizeID++ ) | |
|       for( matrixID = 0; matrixID < (sizeID = = 3) ? 2 : 6; matrixID++ ) { | |
|         scaling_list_deblocking[ sizeID ][ matrixID ] | se(v) |
|       } | |
| } | |

The scaling_list_deblocking[sizeID] [matrixID] syntax elements may be signed integer Exp-Golomb-coded with the left bit first or se(v).

TABLE 3

| aps_rbsp( ) { | Descriptor |
|---|---|
|   aps_id | ue(v) |
|   aps_scaling_list_data_present_flag | u(1) |
|   if( aps_scaling_list_data_present_flag ) | |
|     scaling_list_param( ) | |
|   aps_deblocking_filter_flag | u(1) |
|   if(aps_deblocking_filter_flag) { | |
|     disable_deblocking_filter_flag | u(1) |

TABLE 3-continued

| aps_rbsp( ) { | Descriptor |
|---|---|
|     if( !disable_deblocking_filter_flag ) { | |
|       beta_offset_div2 | se(v) |
|       tc_offset_div2 | se(v) |
|     } | |
|     if( aps_scaling_list_data_present_flag ) { | |
|       scaling_list_deblocking_flag | u(1) |
|       if ( scaling_list_deblocking_flag ) | |
|         for( sizeID = 0; sizeID < 4; sizeID++ ) | |
|           for( matrixID = 0; matrixID < (sizeID = = 3) ? 2 : 6; matrixID++ ) { | |
|             scaling_list_deblocking[ sizeID ][ matrixID ] | se(v) |
|           } | |
|     } | |
|   } | |
|   ...... | |
|   rbsp_trailing_bits( ) | |
| } | |

The examples of Tables 2 and 3 provide a scaling list deblocking flag and a scaling list deblocking[sizeID][matrixID]. In these examples, scaling_list_deblocking_flag equal to 1 may specify that scaling list parameters for deblocking filter adjustment are present in the APS, while value β may specify that no parameters are present and that the deblocking filter should infer all scaling_list_deblocking [sizeID] [matrixID] parameters equal to 0. Scaling_list_deblocking[sizeID] [matrixID] may be equal to the scaling list parameter for deblocking filter adjustment corresponding to sizeID and matrixID.

The deblocking filter in video encoder 20 may determine what "equivalent QP" or QP change, $QP_{QM}$, to apply to the $QP_Y$ values of the P and Q video blocks using the signaled parameters. The $QP_L$ value for deblocking the current edge of a luma component (Y) can be computed as follows:

$$QP_L = (QP_{Y,P} + QP_{QM,P} + QP_{Y,Q} + QP_{QM,Q} + 1)/2 \qquad (1)$$

Similarly, the chroma components (U and V) can be computed as follows:

$$QP_L = (QP_{U,P} + QP_{QM,P} + QP_{U,Q} + QP_{QM,Q} + 1)/2 \qquad (2)$$

$$QP_L = (QP_{V,P} + QP_{QM,P} + QP_{V,Q} + QP_{QM,Q} + 1)/2 \qquad (3)$$

In the formulas above, $QP_U$ represents a QP for a U-chrominance component (that is, a blue hue chrominance component), converted from the $QP_Y$ value, and $QP_V$ represents a QP for a V-chrominance component (that is, a red hue chrominance component), converted from the $QP_Y$ value.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
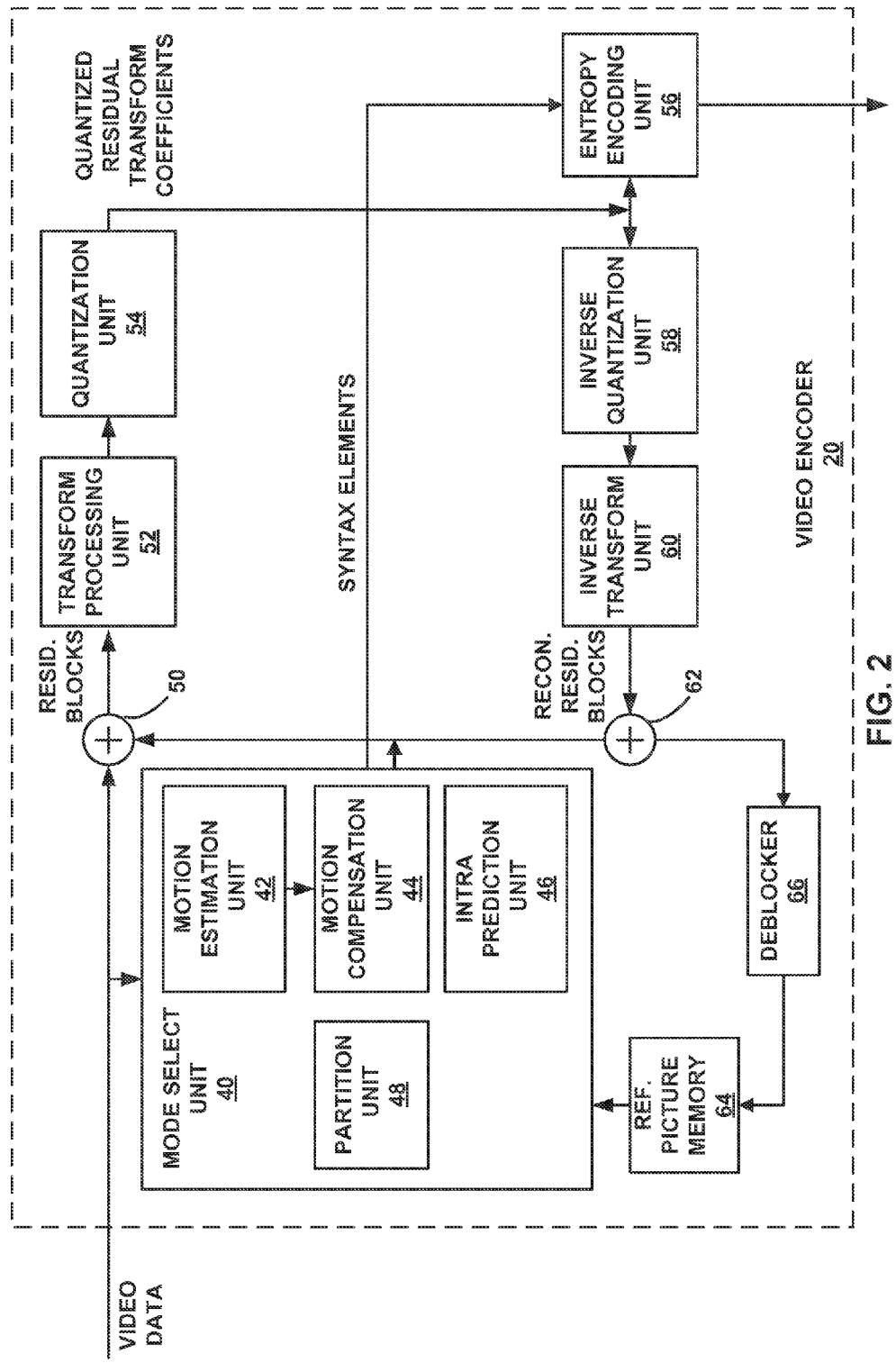
FIG. 2 is a block diagram illustrating an example of a video encoder that may implement techniques for deblocking an edge between video blocks.

FIG. 2 is a block diagram illustrating an example of video encoder 20 that may implement techniques for deblocking an edge between video blocks. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, entropy encoding unit 56, and deblocker 66. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62.

In accordance with the techniques of this disclosure, video encoder 20 includes deblocker 66 that selectively filters the output of summer 62. In particular, deblocker 66 receives reconstructed video data from summer 62, which corresponds to predictive data received from either motion compensation unit 44 or intra-prediction unit 46, added to inverse quantized and inverse transformed residual data. In this manner, deblocker 66 receives decoded blocks of video data, e.g., CUs of an LCU and/or LCUs of a slice or frame. In general, deblocker 66 selectively filters the blocks of video data to remove blockiness artifacts. Deblocker 66 is described in greater detail below.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference pictures to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. Deblocker 66 performs any or all of the techniques of this disclosure to deblock the output of summer 62, that is, the reconstructed video blocks. The reconstructed video blocks, as filtered by deblocker 66, may be used by motion estimation unit 42 and motion compensation unit 44 as a reference block to inter-code a block in a subsequent video frame.

Deblocker 66 is generally configured to analyze pixels of two neighboring CUs near an edge between the two CUs to determine whether to deblock the edge. More particularly, deblocker 66 may alter the values of the pixels near the edge when a high-frequency change in values is detected. Deblocker 66 may be configured to perform any or all of the techniques of this disclosure. For example, deblocker 66 may determine deblocking parameters based on a determined equivalent QP value for reconstructed blocks of video data, as discussed above. Deblocker 66 may also provide deblocking parameters to entropy encoding unit 56, which may encode a data structure, such as an adaptation parameter set (APS), that includes, for example, information indicative of a quantization matrix and/or the deblocking parameters themselves, to be used by a decoder (e.g., video decoder 30) during a deblocking portion of the decoding process.

In some examples, deblocker 66 may determine an equivalent QP for a decoded block (e.g., a reconstructed block received from summer 62) using a quantization matrix for the decoded block. Determining the equivalent QP may include calculating the equivalent QP, receiving the equivalent QP as calculated by another component of video encoder 20, or otherwise obtaining the equivalent QP. Deblocker 66 may also determine an equivalent QP for a neighboring block, with which the decoded block shares an edge, e.g., using the same quantization matrix or a different quantization matrix for the neighboring block. Deblocker 66 may then determine deblocking parameters based on the equivalent QP(s), e.g., of the decoded block and the neighboring block. Deblocker 66 may then deblock the edge between the decoded block and the neighboring block based on the determined deblocking parameters.

Deblocker 66 may determine the equivalent QP for a block by determining a QP change for the block, relative to a signaled QP for the block. The QP change may be signaled in a look-up table, such as Table 1 above. In some examples, deblocker 66 may determine the equivalent QP using a mathematical relationship between an entry in a quantization matrix and the QP change. The mathematical relationship may be based on any or all of the elements of the quantization matrix. For example, deblocker 66 may calculate the mathematical relationship only for a restricted index range of the quantization matrix or a particular frequency zone of frequencies of coefficients for the quantization matrix. Likewise, the mathematical relationship may be based on additional quantization matrices beyond just the quantization matrix that applies to the decoded block.

The mathematical relationship may correspond to a variety of different relationships. In one example, the mathematical relationship may correspond to a maximum comparison between entries of the quantization matrix (or matrices) and the QP change. In other words, the mathematical relationship may correspond to a maximum of the entries of the quantization matrix and the QP change. As another example, the mathematical relationship may correspond to a minimum comparison, that is, a minimum of the entries of the quantization matrix (or matrices) and the QP change. Other mathematical relationships may be used in other examples.

Deblocker 66 may further determine deblocking parameters based on the equivalent QP value of a block. For example, deblocker 66 may determine deblocking parameters β and $t_c$ based on the equivalent QPs of two neighboring blocks that form an edge. As one example, deblocker 66 may calculate the deblocking parameters based on the average of the equivalent QP values for these neighboring blocks. Thus, rather than determining the deblocking parameters based on the QPs signaled for these blocks, deblocker 66 may determine the deblocking parameters based on the equivalent QPs determined for these blocks, e.g., based on quantization matrices for the blocks.

In some examples, deblocker 66 may further signal data for the equivalent QPs for two neighboring blocks. For example, deblocker 66 may signal offset parameters, representative of an offset that is added to the QP of a block to form the equivalent QP for the block. Deblocker 66 may signal one or more offset parameters, e.g., based on one or more of TU size, whether the block is a luminance component or a chrominance component, and/or whether the block is predicted using intra-prediction or inter-prediction. Moreover, deblocker 66 may determine the β and $t_c$ values and signal data for these values, e.g., as a difference between a $QP_L$ value for an edge and the equivalent QP value. In some examples, deblocker 66 may scale the difference value. Deblocker 66 may signal the β and $t_c$ data per transform size. Deblocker 66 may also determine a linear or nonlinear relationship between the parameters, in which case deblocker 66 may signal the slope as a parameter.

In some examples (in addition or in the alternative to the above), deblocker 66 may determine the equivalent QP per TU size, color component, and intra/inter mode, as discussed above, and then signal data indicative of the equivalent QP in a data structure such as a parameter set (e.g., a sequence parameter set (SPS), a picture parameter set (PPS), and/or an adaptation parameter set (APS)) or in a slice header. Deblocker 66 may signal the data indicative of the equivalent QP along with, or separately from, deblocking parameters.

In some examples, deblocker 66 may calculate equivalent QP values as discussed above. Using the equivalent QP values, deblocker 66 may calculate a $QP_L$ value for a current edge in accordance with formulas (1)-(3) described above. Deblocker 66 may use the $QP_L$ value to calculate deblocking parameters, such as β and $t_c$. Deblocker 66 may then use these deblocking parameters to determine whether to deblock an edge, a type of filter (e.g., strong or weak), and when a weak filter is selected, a width of the filter.

In this manner, video encoder 20 of FIG. 2 represents an example of a video encoder configured to determine an equivalent quantization parameter (QP) for a decoded block of video data using a quantization matrix for the decoded block of video data, determine deblocking parameters based on the determined equivalent QP, and deblock an edge of the decoded block based on the determined deblocking parameters.

Figure 3:
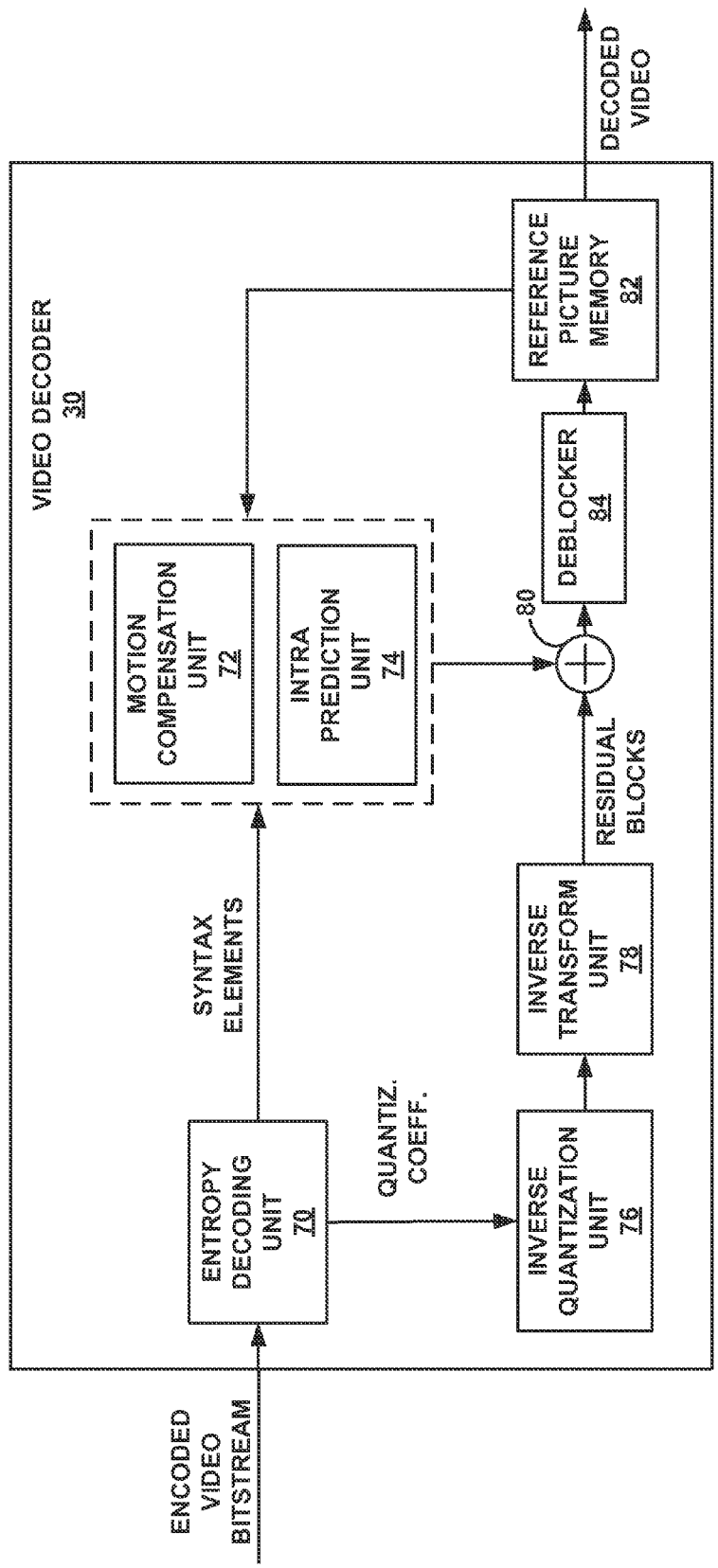
FIG. 3 is a block diagram illustrating an example of a video decoder that may implement techniques for deblocking an edge between video blocks.

FIG. 3 is a block diagram illustrating an example of video decoder 30 that may implement techniques for deblocking an edge between video blocks. In the example of FIG. 3, video decoder 30 includes an entropy decoding unit 70, motion compensation unit 72, intra prediction unit 74, inverse quantization unit 76, inverse transformation unit 78, reference picture memory 82, summer 80, and deblocker 84.

Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 92.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 80. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 78 with the corresponding predictive blocks generated by motion compensation unit 82. Summer 80 represents the component or components that perform this summation operation. Deblocker 84 may be configured to perform any or all of the techniques of this disclosure to deblock the output of summer 80. The decoded video blocks in a given frame or picture, as filtered by deblocker 84, are then stored in reference picture memory 92, which stores reference pictures used for subsequent motion compensation. Reference picture memory 82 also stores decoded video for later presentation on a display device, such as display device 32 of FIG. 1.

Deblocker 84 is generally configured to analyze pixels of two neighboring CUs near an edge between the two CUs to determine whether to deblock the edge. More particularly, deblocker 84 may alter the values of the pixels near the edge when a high-frequency change in values is detected. Deblocker 84 may be configured to perform any or all of the techniques of this disclosure. For example, deblocker 84 may determine deblocking parameters based on a determined equivalent QP value for reconstructed blocks of video data, as discussed above. Entropy decoding unit 70 may receive entropy-encoded deblocking parameters, and decode and send the deblocking parameters to deblocker 84. The deblocking parameters may be included in a data structure, such as an adaptation parameter set (APS), that includes, for example, information indicative of a quantization matrix and/or the deblocking parameters themselves, to be used during a deblocking portion of the decoding process.

In some examples, deblocker 84 may determine an equivalent QP for a decoded block (e.g., a reconstructed block received from summer 62) using a quantization matrix for the decoded block. Determining the equivalent QP may include calculating the equivalent QP, receiving the equivalent QP as calculated by another component of video encoder 20, or otherwise obtaining the equivalent QP. Deblocker 84 may also determine an equivalent QP for a neighboring block, with which the decoded block shares an edge, e.g., using the same quantization matrix or a different quantization matrix for the neighboring block. Deblocker 84 may then determine deblocking parameters based on the equivalent QP(s), e.g., of the decoded block and the neighboring block. Deblocker 84 may then deblock the edge between the decoded block and the neighboring block based on the determined deblocking parameters.

Deblocker 84 may determine the equivalent QP for a block by determining a QP change for the block, relative to a signaled QP for the block. The QP change may be signaled in a look-up table, such as Table 1 above. In some examples, deblocker 84 may determine the equivalent QP using a mathematical relationship between an entry in a quantization matrix and the QP change. The mathematical relationship may be based on any or all of the elements of the quantization matrix. For example, deblocker 84 may calculate the mathematical relationship only for a restricted index range of the quantization matrix or a particular frequency zone of frequencies of coefficients for the quantization matrix. Likewise, the mathematical relationship may be based on additional quantization matrices beyond just the quantization matrix that applies to the decoded block.

The mathematical relationship may correspond to a variety of different relationships. In one example, the mathematical relationship may correspond to a maximum comparison between entries of the quantization matrix (or matrices) and the QP change. In other words, the mathematical relationship may correspond to a maximum of the entries of the quantization matrix and the QP change. As another example, the mathematical relationship may correspond to a minimum comparison, that is, a minimum of the entries of the quantization matrix (or matrices) and the QP change. Other mathematical relationships may be used in other examples.

Deblocker 84 may further determine deblocking parameters based on the equivalent QP value of a block. For example, deblocker 84 may determine deblocking parameters $\beta$ and $t_c$ based on the equivalent QPs of two neighboring blocks that form an edge. As one example, deblocker 84 may calculate the deblocking parameters based on the average of the equivalent QP values for these neighboring blocks. Thus, rather than determining the deblocking parameters based on the QPs signaled for these blocks, deblocker 84 may determine the deblocking parameters based on the equivalent QPs determined for these blocks, e.g., based on quantization matrices for the blocks.

In some examples, deblocker 84 may receive data indicative of the equivalent QPs for two neighboring blocks. For example, deblocker 84 may receive offset parameters, representative of an offset that is to be added to the QP of a block to form the equivalent QP for the block. Deblocker 84 may receive one or more offset parameters, e.g., based on one or more of TU size, whether the block is a luminance component or a chrominance component, and/or whether the block is predicted using intra-prediction or inter-prediction. Moreover, deblocker 84 may determine the $\beta$ and $t_c$ values and signal data for these values, e.g., as a difference between a $QP_L$ value for an edge and the equivalent QP value. In some examples, deblocker 84 may scale the difference value. Deblocker 84 may receive the $\beta$ and $t_c$ data per transform size. Deblocker 84 may also receive data describing a linear or nonlinear relationship between the parameters, in which case deblocker 84 may receive data defining the slope as a parameter.

In some examples (in addition or in the alternative to the above), deblocker 84 may receive data indicative of the equivalent QP in a data structure such as a parameter set (e.g., a sequence parameter set (SPS), a picture parameter set (PPS), and/or an adaptation parameter set (APS)), or in a slice header, where the data structure may define data indicative of the equivalent QP per TU size, color component, and intra/inter mode. Deblocker 84 may receive the data indicative of the equivalent QP along with, or separately from, deblocking parameters.

In some examples, deblocker 84 may calculate equivalent QP values as discussed above. Using the equivalent QP values, deblocker 84 may calculate a $QP_L$ value for a current edge in accordance with formulas (1)-(3) described above. Deblocker 84 may use the $QP_L$ value to calculate deblocking parameters, such as $\beta$ and $t_c$. Deblocker 84 may then use these deblocking parameters to determine whether to deblock an edge, a type of filter (e.g., strong or weak), and when a weak filter is selected, a width of the filter.

In this manner, video decoder 30 of FIG. 3 represents an example of a video decoder configured to determine an equivalent quantization parameter (QP) for a decoded block of video data using a quantization matrix for the decoded block of video data, determine deblocking parameters based on the determined equivalent QP, and deblock an edge of the decoded block based on the determined deblocking parameters.

Figure 4:
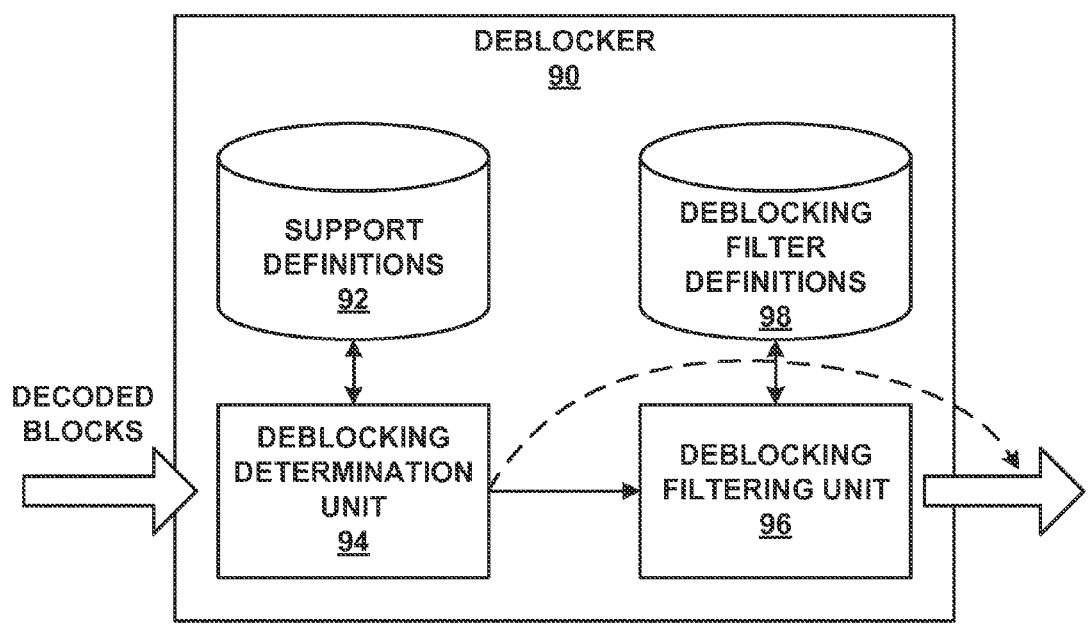
FIG. 4 is a block diagram illustrating components of an example deblocker.

FIG. 4 is a block diagram illustrating components of an example deblocker 90. In general, either or both of deblocker 66 (FIG. 2) and deblocker 84 (FIG. 3) may include components substantially similar to those of deblocker 90. Other video coding devices, such as video encoders, video decoders, video encoder/decoders (CODECs), and the like may also include components substantially similar to deblocker 90. Deblocker 90 may be implemented in hardware, software, or firmware. When implemented in software or firmware, corresponding hardware (such as one or more processors or processing units and memory for storing instructions for the software or firmware) may also be provided.

In the example of FIG. 4, deblocker 90 includes deblocking determination unit 94, support definitions 92, deblocking filtering unit 96, and deblocking filter definitions 98. Any or all of the components of deblocker 90 may be functionally integrated. The components of deblocker 90 are illustrated separately only for purposes of illustration. In general, deblocker 90 receives data for decoded blocks, e.g., from a summation component, such as unit 62 (FIG. 2) or unit 80 (FIG. 3), that combines prediction data with residual data for the blocks.

Deblocking determination unit 94 may apply the techniques of this disclosure for simplified determinations of whether to deblock edge segments. In some examples, deblocking determination unit 94 may perform these deblocking determinations in parallel, or substantially in parallel. That is, deblocking determination unit 94 may execute a multithreaded software program with one thread devoted to each edge segment and/or may include separate hardware components, i.e., processors or processing cores, for analyzing each edge segment. In this manner, the deblocking decisions may be performed substantially simultaneously, e.g., substantially in parallel.

In accordance with the techniques of this disclosure, deblocker 90 may be configured to determine equivalent QP values for two neighboring blocks that define an edge. Deblocker 90 may use any or all of the techniques of this disclosure for determining the equivalent QP values. Using the equivalent QP values, deblocker 90 may determine a $QP_L$ value for the edge defined by the two neighboring blocks, e.g., using an appropriate one of formulas (1)-(3). Deblocker 90 may then use the $QP_L$ value to determine deblocking parameters, e.g., β and $t_c$ values.

Deblocker 90 may be configured to analyze lines of pixels perpendicular to and intersecting the respective edge segments to determine whether to deblock any or all of the edge segments, whether to apply a weak or strong filter to the edge segments to be deblocked, and widths of weak filters. In particular, deblocking determination unit 94 may be configured to make these various determinations (i.e., whether to deblock an edge segment, whether to apply a strong or weak filter to deblock the edge segment, and a width of a weak filter when a weak filter is selected) based at least in part on the deblocking parameters. Support definitions 92 includes data defining the lines of pixels to be used to make these determinations. Support definitions 92 may include, for example, an indication that lines of pixels that are two pixels away from the common point, and six pixels long, are to be used to make the various determinations.

Deblocking filter definitions 98 define various deblocking filters, such as strong filters and weak filters of various widths. The widths of weak filters may define weak filters that modify one pixel on each side of a boundary, two pixels on each side of a boundary, and one pixel on one side and two pixels on the other side of a boundary. The number of pixels modified by a deblocking filter is not necessarily the same as the number of pixels used as input to the deblocking filter. Thus, deblocking filter definitions 98 may include data defining a number of inputs to a deblocking filter, as well as data defining a number of pixels to be modified using the inputs. In general, a deblocking filter is defined by input pixels and filter coefficients to be mathematically applied to the input pixels to produce modified values of certain pixels.

Figure 5:
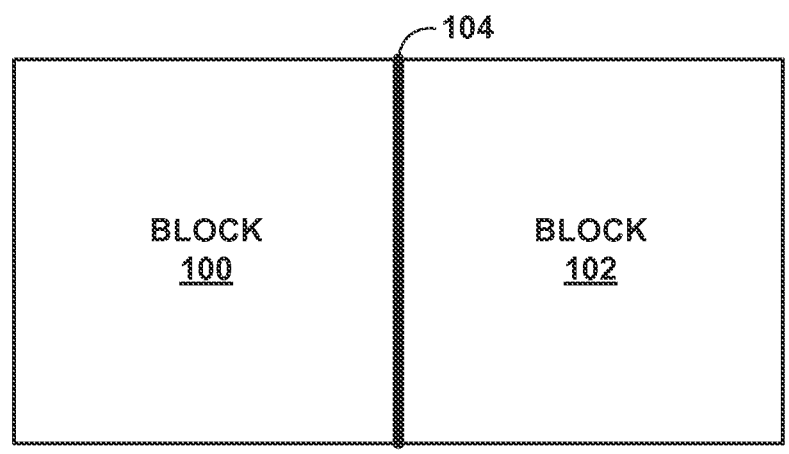
FIG. 5 is a conceptual diagram illustrating an edge formed by two neighboring blocks.

FIG. 5 is a conceptual diagram illustrating an edge 104 formed by two neighboring blocks 100, 102. Blocks 100, 102 may correspond to blocks P and Q described above. Although the example of FIG. 5 shows blocks 100, 102 in a side-by-side arrangement, it should be understood that above-and-below neighboring blocks may also form an edge that can be deblocked in accordance with the techniques of this disclosure. Moreover, although blocks 100, 102 are shown as being the same size, the neighboring blocks forming an edge are not necessarily the same size.

Blocks 100, 102 may represent transform blocks of respective transform units. Accordingly, blocks 100, 102 may be associated with respective quantization parameter (QP) values. Furthermore, one or more quantization matrices may be associated with blocks 100, 102. In accordance with the techniques of this disclosure, a deblocker, such as deblocker 66 (FIG. 2), deblocker 84 (FIG. 3), or deblocker 90 (FIG. 4) may be configured to calculate respective equivalent QPs for blocks 100, 102. That is, the deblocker may calculate an equivalent QP for block 100, and an equivalent QP for block 102, e.g., using the applicable quantization matrix, as explained above.

The deblocker may then use the equivalent QP values for blocks 100, 102 to calculate a $QP_L$ value for edge 104. For example, when blocks 100, 102 are luminance transform blocks, the deblocker may calculate the $QP_L$ value using formula (1) described above. As another example, when blocks 100, 102 are blue-hue chrominance transform blocks, the deblocker may calculate the $QP_L$ value using formula (2) described above. As yet another example, when blocks 100, 102 are red-hue chrominance transform blocks, the deblocker may calculate the $QP_L$ value using formula (3) described above.

The deblocker may then use the calculated $QP_L$ value to calculate deblocking parameters (e.g., β and $t_c$ values) for edge 104. The deblocker may use the deblocking parameters to determine whether to deblock edge 104, e.g., by analyzing one or more lines of pixels of blocks 100, 102 that are perpendicular to edge 1040. When the deblocker determines to deblock edge 104, the deblocker may determine whether to deblock edge 104 using a strong or weak filter, again based on the deblocking parameters and perpendicular lines of pixels to edge 104. Similarly, when the deblocker determines to use a weak filter, the deblocker may determine a width of the weak filter, e.g., whether to modify values of one pixel on each side of edge 104, two pixels on each side of edge 104, or one pixel on one side of edge 104 and two pixels on the other side of edge 104.

Figure 6:
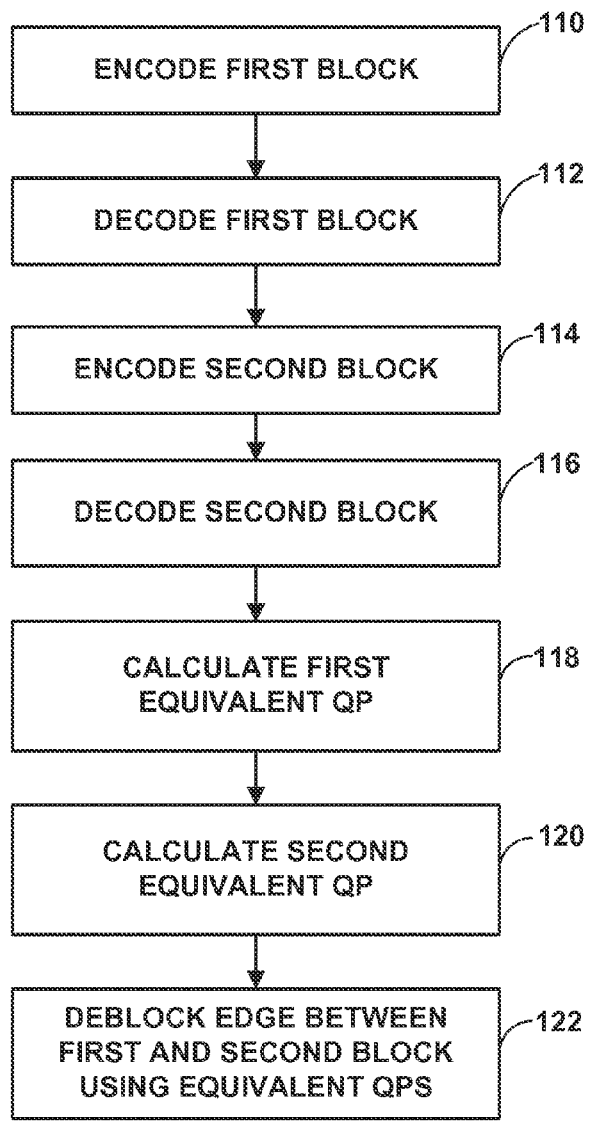
FIG. 6 is a flowchart illustrating an example method for performing deblocking during a video encoding process in accordance with the techniques of this disclosure.

FIG. 6 is a flowchart illustrating an example method for performing deblocking during a video encoding process in accordance with the techniques of this disclosure. For purposes of explanation, the method of FIG. 6 is explained with respect to video encoder 20 of FIG. 2, including deblocker

66. However, it should be understood that other devices may be configured to perform a method substantially similar to the method of FIG. 6.

Initially, video encoder 20 may encode a first block of video data (110). For example, with respect to FIG. 5, video encoder 20 may form a prediction block for block 100. Video encoder 20 may form the prediction block using intra-prediction or inter-prediction. Video encoder 20 may then form a residual block for block 100 by calculating pixel-by-pixel differences between an original block for block 100 and the predicted block for block 100. Transform processing unit 52 of video encoder 20 may then transform the residual block, forming a transform block. Quantization unit 54 of video encoder 20 may then quantize coefficients of the transform block. In particular, quantization unit 54 may quantize the coefficients using a quantization parameter for block 100 and a quantization matrix for block 100. The quantization matrix may provide offsets relative to the quantization parameter for individual coefficient positions of the transform block.

Video encoder 20 may then decode the first block (112). For example, inverse quantization unit 58 may inverse quantize the transform block for block 100 using the quantization parameter and quantization matrix. Inverse transform unit 60 may then inverse transform the transform block, substantially reproducing the residual block. Video encoder 20 may then combine the residual block with the predicted block, to substantially reproduce the original block for block 100.

Video encoder 20 may also encode a second block (114), which may correspond to block 102 of FIG. 5. That is, the second block may correspond to a neighboring block to the first block, which shares an edge with the first block. Although the example of FIG. 5 illustrates two side-by-side blocks, it should be understood that above-and-below neighboring blocks may also form an edge that can be deblocked in accordance with the techniques of this disclosure. Encoding the second block may be performed in a manner substantially similar to the encoding of the first block, except that the prediction mode, QP, and quantization matrix for the second block (e.g., block 102) may be selected independently for the second block. Likewise, video encoder 20 may decode the second block (116) in a manner substantially similar to the decoding of the first block.

In this manner, video encoder 20 may encode and decode two neighboring blocks that share a common edge. In accordance with the techniques of this disclosure, video encoder 20 may calculate a first equivalent QP for block 100 (118), and calculate a second equivalent QP for block 102 (120). Calculating the equivalent QPs for blocks 100, 102 may be based on the quantization matrices for blocks 100, 102, as explained above.

Deblocker 66 of video encoder 20 may then deblock the edge between the first and second blocks (e.g., edge 104 between blocks 100, 102 in FIG. 5) using the equivalent QPs (122). For example, deblocker 66 may calculate deblocking parameters ($\beta$ and/or $t_C$) using the equivalent QPs. Deblocker 66 may also (additionally or alternatively) calculate a $QP_L$ value for the edge based on the equivalent QPs, as explained above. Deblocker 66 may then determine whether to deblock the edge based on the $QP_L$ value and/or the deblocking parameters. After determining to deblock the edge, deblocker 66 may determine whether to deblock the edge using a strong filter or a weak filter. After determining to deblock the edge using the weak filter, deblocker 66 may determine the width of the weak filter, that is, the number of pixels on either side of the edge as part of the deblocking process.

In some examples, video encoder 20 may further encode data representative of the equivalent QPs for blocks 100, 102. In some examples, video encoder 20 may encode data representative of the deblocking parameters (e.g., $\beta$ and/or $t_C$). Video encoder 20 may encode the data representative of the equivalent QPs and/or the deblocking parameters in a data structure, such as a parameter set or a slice header.

In this manner, the method of FIG. 6 represents an example of a method including determining an equivalent quantization parameter (QP) for a decoded block of video data using a quantization matrix for the decoded block of video data, determining deblocking parameters based on the determined equivalent QP, and deblocking an edge of the decoded block based on the determined deblocking parameters.

Figure 7:
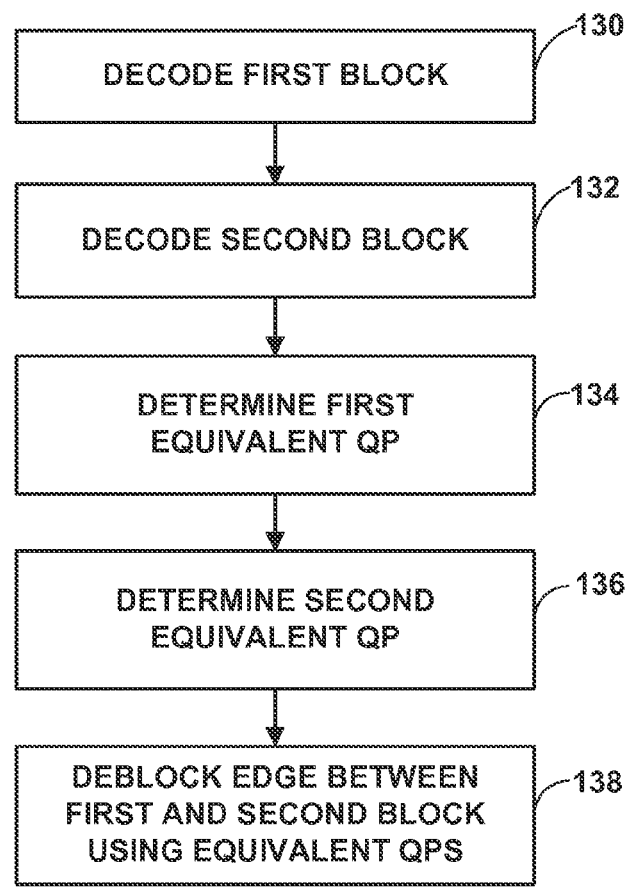
FIG. 7 is a flowchart illustrating an example method for performing deblocking during a video decoding process in accordance with the techniques of this disclosure.

FIG. 7 is a flowchart illustrating an example method for performing deblocking during a video decoding process in accordance with the techniques of this disclosure. For purposes of explanation, the method of FIG. 7 is explained with respect to video decoder 30 of FIG. 3, including deblocker 84. However, it should be understood that other devices may be configured to perform a method substantially similar to the method of FIG. 7.

Initially, video decoder 30 may decode a first block (130), e.g., block 100 of FIG. 5. Video decoder 30 may also decode a second block (132), e.g., block 102 of FIG. 5. The second block neighbors the first block, and the first and second block define a common edge, e.g., edge 104 of FIG. 5 defined by blocks 100, 102. Decoding the first and second blocks may be performed in a manner substantially similar to the decoding process described with respect to steps 112, 116 of FIG. 6. For example, inverse quantization unit 76 may inverse quantize received transform blocks using respective quantization parameters and quantization matrices for the transform blocks, and inverse transform unit 78 may inverse transform the transform blocks, to reproduce residual blocks. Video decoder 30 may also predict data for the blocks using motion compensation unit 72 and/or intra prediction unit 74. Summer 80 may combine the residual blocks with the predicted blocks.

Deblocker 84 of video decoder 30 may then determine a first equivalent QP for the first block (134) and a second equivalent QP for the second block (136). In some examples, video decoder 30 may decode a data structure, such as a parameter set or slice header, that includes data indicative of the equivalent QP. Alternatively, deblocker 84 may calculate the equivalent QPs in substantially the same manner as video encoder 20. That is, deblocker 84 may calculate the equivalent QPs using the quantization matrices for the first and second blocks and the quantization parameters signaled for the first and second blocks.

Deblocker 84 may then deblock the edge between the first and second blocks (e.g., edge 104 between blocks 100, 102) using the equivalent QPs (138). For example, deblocker 84 may calculate deblocking parameters ($\beta$ and/or $t_C$) using the equivalent QPs. Alternatively, deblocker 84 may decode data representative of the deblocking parameters. Deblocker 84 may also (additionally or alternatively) calculate a $QP_L$ value for the edge based on the equivalent QPs, as explained above. Deblocker 84 may then determine whether to deblock the edge based on the $QP_L$ value and/or the deblocking parameters. After determining to deblock the edge, deblocker 84 may determine whether to deblock the edge using a strong filter or a weak filter. After determining to deblock the edge using the weak filter, deblocker 84 may determine the width of the weak filter, that is, the number of pixels on either side of the edge as part of the deblocking process.

In this manner, the method of FIG. 7 represents an example of a method including determining an equivalent quantization parameter (QP) for a decoded block of video data using a quantization matrix for the decoded block of video data, determining deblocking parameters based on the determined equivalent QP, and deblocking an edge of the decoded block based on the determined deblocking parameters.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   inverse quantizing a first block of quantized transform coefficients for a first block of video data to produce a first block of transform coefficients, comprising inverse transforming the first block of quantized transform coefficients using a first quantization parameter (QP) for the first block of video data and a first quantization matrix for the first block of video data;
   inverse transforming the first block of transform coefficients to produce a first residual block for the first block of video data;
   decoding the first block of video data using the first residual block to form a first decoded block of video data;
   inverse quantizing a second block of quantized transform coefficients for a second block of video data to produce a second block of transform coefficients, comprising inverse transforming the second block of quantized transform coefficients using a second quantization parameter (QP) for the second block of video data and a second quantization matrix for the second block of video data, the first block of video data and the second block of video data forming an edge between the first block of video data and the second block of video data;
   inverse transforming the second block of transform coefficients to produce a second residual block for the second block of video data;
   decoding the second block of video data using the second residual block to form a second decoded block of video data;
   determining a first equivalent quantization parameter (QP) for the first decoded block of video data using the first quantization matrix, the first equivalent QP being different from the first QP for the first block;
   determining a second equivalent QP for the second decoded block of video data using the second quantization matrix, the second equivalent QP being different from the second QP for the second block;

calculating a $QP_L$ value for the edge, the $QP_L$ value comprising an average of the first QP and the second QP;

determining deblocking parameters based on the determined first equivalent QP and the determined second equivalent QP, wherein determining the deblocking parameters comprises:

coding information indicative of deblocking offset parameter values;

applying one of the deblocking offset parameter values to the $QP_L$ value to form an offset $QP_L$ value; and determining the deblocking parameters based on the difference between the offset $QP_L$ value and the first equivalent QP or the second equivalent QP;

deblocking the edge formed between the first block and the second block based on the determined deblocking parameters.

2. The method of claim 1, wherein determining at least one of the first equivalent QP or the second equivalent QP comprises determining the first equivalent QP or the second equivalent QP based at least in part on an element of the first quantization matrix or the second quantization matrix corresponding to a DC component for the first decoded block or the second decoded block.

3. The method of claim 1,
wherein determining the deblocking parameters comprises:

determining a first QP change for the first decoded block;

calculating the first equivalent QP based on the first QP change;

determining a second QP change for the second decoded block;

calculating the second equivalent QP based on the second QP change;

averaging the first equivalent QP and the second equivalent QP; and determining the deblocking parameters based on the average of the first equivalent QP and the second equivalent QP.

4. The method of claim 3, wherein calculating the first equivalent QP comprises applying the first QP change to the first QP for the first decoded block, and wherein calculating the second equivalent QP comprises applying the second QP change to the second QP for the second decoded block.

5. The method of claim 3, wherein determining the first QP change comprises determining the first QP change based on a look-up table, and wherein determining the second QP change comprises determining the second QP change based on the look-up table.

6. The method of claim 3, wherein determining the first equivalent QP comprises determining the first equivalent QP based on a mathematical relationship between an entry in the first quantization matrix and the first QP change, and wherein determining the second equivalent QP comprises determining the second equivalent QP based on a mathematical relationship between an entry in the second quantization matrix and the second QP change.

7. The method of claim 3, further comprising:

computing a mathematical relationship between at least some elements of the first quantization matrix or the second quantization matrix;

wherein determining the first QP change comprises determining the first QP change based on the computed mathematical relationship; and wherein determining the second QP change comprises determining the second QP change based on the computed mathematical relationship.

8. The method of claim 7, wherein computing the mathematical relationship comprises computing the mathematical relationship of all elements of the first quantization matrix or the second quantization matrix.

9. The method of claim 7, wherein computing the mathematical relationship comprises computing the mathematical relationship of a restricted index range of the first quantization matrix or the second quantization matrix.

10. The method of claim 9, wherein the restricted index range corresponds to a particular frequency zone of frequencies of coefficients to which the elements of the first quantization matrix or the second quantization matrix correspond.

11. The method of claim 7, wherein computing the mathematical relationship comprises computing the mathematical relationship for all elements of a plurality of quantization matrices, including the first quantization matrix or the second quantization matrix.

12. The method of claim 7, wherein computing the mathematical relationship comprises computing the mathematical relationship of a restricted index range of a plurality of quantization matrices, including the first quantization matrix or the second quantization matrix.

13. The method of claim 12, wherein the restricted index range corresponds to a particular frequency zone of frequencies of coefficients to which the elements of the plurality of quantization matrices correspond.

14. The method of claim 12, wherein each of the plurality of quantization matrices corresponds to a particular combination of block size of a particular block, a type of component to which the particular block corresponds, and whether the particular block was predicted using intra-mode or inter-mode, wherein the type of component comprises one of a luminance component, a red-hue chrominance component, or a blue-hue chrominance component.

15. The method of claim 7, wherein the mathematical relationship comprises one of an average and a maximum.

16. The method of claim 1, further comprising coding at least one of an adaptation parameter set (APS), a picture parameter set (PPS), and a sequence parameter set (SPS) having information indicative of at least one of the first quantization matrix or the second quantization matrix.

17. The method of claim 1, wherein calculating the $QP_L$ value comprises:

when the first decoded block comprises a first luminance block and the second decoded block comprises a second luminance block, $QP_L=(QP_{Y,P}+QP_{QM,P}+QP_{Y,Q}+QP_{QM,Q}+1)/2$, the $QP_{Y,P}$ value comprising the first QP value, the $QP_{Y,Q}$ value comprising the second QP value, the $QP_{QM,P}$ value comprising the first equivalent OF, and the $QP_{QM,Q}$ value comprising the second equivalent QP;

when the first decoded block comprises a first U-chrominance block and the second decoded block comprises a second U-chrominance block, $QP_L=(QP_{U,P}+QP_{QM,P}+QP_{U,Q}+QP_{QM,Q}+1)/2$; and when the first decoded block comprises a first V-chrominance block and the second decoded block comprises a second V-chrominance block, $QP_L=(QP_{V,P}+QP_{QM,P}+QP_{V,Q}+QP_{QM,Q}+1)/2$, wherein $QP_{U,P}$ corresponds to a first U-chrominance value converted from the $QP_{Y,P}$ value, wherein $QP_{U,Q}$ corresponds to a second U-chrominance value converted from the $QP_{Y,Q}$ value, wherein $QP_{V,P}$ corresponds to a first V-chrominance value converted from the $QP_{Y,P}$ value, and wherein $QP_{V,Q}$ corresponds to a second V-chrominance value converted from the $QP_{Y,Q}$ value.

18. The method of claim 1, further comprising coding a value representative of at least one of the first equivalent QP or the second equivalent QP in at least one of a sequence parameter set (SPS), a picture parameter set (PPS), an adaptation parameter set (APS), and a slice header.

19. The method of claim 1, further comprising entropy decoding a first set of quantized transform coefficients to form the first block of quantized transform coefficients, and entropy decoding a second set of quantized transform coefficients to form the second block of quantized transform coefficients.

20. The method of claim 1, further comprising:
transforming and quantizing a first original residual block to form the first block of quantized transform coefficients; and
transforming and quantizing a second original residual block to form the second block of quantized transform coefficients.

21. A device for coding video data, the device comprising:
a memory configured to store video data; and
a video coder configured to:
 inverse quantize a first block of quantized transform coefficients for a first block of video data to produce a first block of transform coefficients, comprising inverse transforming the first block of quantized transform coefficients using a first quantization parameter (QP) for the first block of video data and a first quantization matrix for the first block of video data;
 inverse transform the first block of transform coefficients to produce a first residual block for the first block of video data;
 decode the first block of video data using the first residual block to form a first decoded block of video data;
 inverse quantize a second block of quantized transform coefficients for a second block of video data to produce a second block of transform coefficients, comprising inverse transforming the second block of quantized transform coefficients using a second quantization parameter (QP) for the second block of video data and a second quantization matrix for the second block of video data, the first block of video data and the second block of video data forming an edge between the first block of video data and the second block of video data;
 inverse transform the second block of transform coefficients to produce a second residual block for the second block of video data;
 decode the second block of video data using the second residual block to form a second decoded block of video data;
 determine a first equivalent quantization parameter (QP) for the first decoded block of video data using the first quantization matrix, the first equivalent QP being different from the first QP for the first block;
 determine a second equivalent QP for the second decoded block of video data using the second quantization matrix, the second equivalent QP being different from the second QP for the second block;
 calculate a $QP_L$ value for the edge, the $QP_L$ value comprising an average of the first QP and the second QP,
 determine deblocking parameters based on the determined first equivalent QP and the determined second equivalent QP, wherein to determine the deblocking parameters, the video coder is configured to:
  code information indicative of deblocking offset parameter values;
  apply one of the deblocking offset parameter values to the QP value to form an offset $QP_L$ value; and
  determine the deblocking parameters based on the difference between the offset $QP_L$ value and the first equivalent QP or the second equivalent QP, and
 deblock the edge formed between the first block and the second block based on the determined deblocking parameters.

22. The device of claim 21, wherein the video coder is configured to determine the first equivalent QP or the second equivalent QP based at least in part on an element of the first quantization matrix or the second quantization matrix corresponding to a DC component for the first decoded block or the second decoded block.

23. The device of claim 21, wherein the video coder is configured to determine a first QP change for the first decoded block, calculate the first equivalent QP based on the first QP change, determine a second QP change for the second decoded block, calculate the second equivalent QP based on the second QP change, and average the first equivalent QP and the second equivalent QP, and wherein the video coder is configured to determine the deblocking parameters based on the average of the first equivalent QP and the second equivalent QP.

24. The device of claim 23, wherein the video coder is further configured to compute a mathematical relationship between at least some elements of the first quantization matrix or the second quantization matrix, determine the first QP change based on the computed mathematical relationship, and determine the second QP change based on the computed mathematical relationship.

25. The device of claim 21, wherein to calculate the $QP_L$ value, the video coder is configured to calculate:
when the first decoded block comprises a first luminance block and the second decoded block comprises a second luminance block, $QP_L=(QP_{Y,P}+QP_{QM,P}+QP_{Y,Q}+QP_{QM,Q}+1)/2$;
when the first decoded block comprises a first U-chrominance block and the second decoded block comprises a second U-chrominance block, $QP_L=(QP_{U,P}+QP_{QM,P}+QP_{U,Q}+QP_{QM,Q}+1)/2$; and
when the first decoded block comprises a first V-chrominance block and the second decoded block comprises a second V-chrominance block, $QP_L=(QP_{V,P}+QP_{QM,P}+QP_{V,Q}+QP_{QM,Q}+1)/2$,
wherein $QP_U$ corresponds to a U-chrominance value converted from the $QP_Y$ value, and wherein $QP_V$ corresponds to a V-chrominance value converted from the $QP_Y$ value.

26. The device of claim 21, wherein the video coder comprises a video decoder.

27. The device of claim 21, wherein the video coder comprises a video encoder.

28. The device of claim 21, wherein the device comprises at least one of:
an integrated circuit;
a microprocessor; and
a wireless communication device that includes the video coder.

29. A device for coding video data, the device comprising:
means for inverse quantizing a first block of quantized transform coefficients for a first block of video data to produce a first block of transform coefficients, comprising inverse transforming the first block of quantized transform coefficients using a first quantization parameter (QP) for the first block of video data and a first quantization matrix for the first block of video data;
means for inverse transforming the first block of transform coefficients to produce a first residual block for the first block of video data;
means for decoding the first block of video data using the first residual block to form a first decoded block of video data;
means for inverse quantizing a second block of quantized transform coefficients for a second block of video data to produce a second block of transform coefficients, comprising inverse transforming the second block of quantized transform coefficients using a second quantization parameter (QP) for the second block of video data and a second quantization matrix for the second block of video data, the first block of video data and the second block of video data forming an edge between the first block of video data and the second block of video data;
means for inverse transforming the second block of transform coefficients to produce a second residual block for the second block of video data;
means for decoding the second block of video data using the second residual block to form a second decoded block of video data;
means for determining a first equivalent quantization parameter (QP) for the first decoded block of video data using the first quantization matrix, the first equivalent QP being different from the first QP for the first block;
means for determining a second equivalent QP for the second decoded block of video data using the second quantization matrix, the second equivalent QP being different from the second QP for the second block;
means for calculating a $QP_L$ value for the edge, the $QP_L$ value comprising an average of the first QP and the second QP;
means for determining deblocking parameters based on the determined first equivalent QP and the determined second equivalent QP, wherein the means for determining the deblocking parameters comprises:
means for coding information indicative of deblocking offset parameter values;
means for applying one of the deblocking offset parameter values to the $QP_L$ value to form an offset $QP_L$ value; and
means for determining the deblocking parameters based on the difference between the offset $QP_L$ value and the first equivalent QP or the second equivalent QP; and
means for deblocking the edge formed between the first block and the second block based on the determined deblocking parameters.

30. The device of claim 29, wherein the means for determining at least one of the first equivalent QP or the second equivalent QP comprise means for determining the first equivalent QP or the second equivalent QP based at least in part on an element of the first quantization matrix or the second quantization matrix corresponding to a DC component for the first decoded block or the second decoded block.

31. The device of claim 29,
wherein the means for determining the deblocking parameters comprises:
means for determining a first QP change for the first decoded block;
means for calculating the first equivalent QP based on the first QP change;
means for determining a second QP change for the second decoded block;
means for calculating the second equivalent QP based on the second QP change;
means for averaging the first equivalent QP and the second equivalent QP; and
means for determining the deblocking parameters based on the average of the first equivalent QP and the second equivalent QP.

32. The device of claim 31, further comprising means for computing a mathematical relationship between at least some elements of the first quantization matrix or the second quantization matrix,
wherein the means for determining the first QP change comprises means for determining the first QP change based on the computed mathematical relationship; and
wherein the means for determining the second QP change comprises means for determining the second QP change based on the computed mathematical relationship.

33. The device of claim 29, wherein the means for calculating the $QP_L$ value comprise means for calculating the $QP_L$ value as:
when the first decoded block comprises a first luminance block and the second decoded block comprises a second luminance block, $QP_L=(QP_{Y,P}+QP_{QM,P}+QP_{Y,Q}+QP_{QM,Q}+1)/2$;
when the first decoded block comprises a first U-chrominance block and the second decoded block comprises a second U-chrominance block, $QP_L=(QP_{U,P}+QP_{QM,P}+QP_{U,Q}+QP_{QM,Q}+1)/2$; and
when the first decoded block comprises a first V-chrominance block and the second decoded block comprises a second V-chrominance block, $QP_L=(QP_{V,P}+QP_{QM,P}+QP_{V,Q}+QP_{QM,Q}+1)/2$,
wherein $QP_U$ corresponds to a U-chrominance value converted from the $QP_Y$ value, and wherein $QP_V$ corresponds to a V-chrominance value converted from the $QP_Y$ value.

34. The device of claim 29, further comprising means for entropy decoding a first set of quantized transform coefficients to form the first block of quantized transform coefficients, and means for entropy decoding a second set of quantized transform coefficients to form the second block of quantized transform coefficients.

35. The device of claim 29, further comprising:
means for transforming and quantizing a first original residual block to form the first block of quantized transform coefficients; and
means for transforming and quantizing a second original residual block to form the second block of quantized transform coefficients.

36. A non-transitory computer-readable storage medium having stored thereon instructions that, when executed, cause a processor to:
inverse quantize a first block of quantized transform coefficients for a first block of video data to produce a first block of transform coefficients, comprising inverse transforming the first block of quantized transform coefficients using a first quantization parameter (QP)

for the first block of video data and a first quantization matrix for the first block of video data;
inverse transform the first block of transform coefficients to produce a first residual block for the first block of video data;
decode the first block of video data using the first residual block to form a first decoded block of video data;
inverse quantize a second block of quantized transform coefficients for a second block of video data to produce a second block of transform coefficients, comprising inverse transforming the second block of quantized transform coefficients using a second quantization parameter (QP) for the second block of video data and a second quantization matrix for the second block of video data, the first block of video data and the second block of video data forming an edge between the first block of video data and the second block of video data;
inverse transform the second block of transform coefficients to produce a second residual block for the second block of video data;
decode the second block of video data using the second residual block to form a second decoded block of video data;
determine a first equivalent quantization parameter (QP) for the first decoded block of video data using the first quantization matrix, the first equivalent QP being different from the first QP for the first block;
determine a second equivalent QP for the second decoded block of video data using the second quantization matrix, the second equivalent QP being different from the second QP for the second block,
calculate a $QP_L$ value for the edge, the $QP_L$ value comprising an average of the first QP and the second QP;
determine deblocking parameters based on the determined first equivalent QP and the determined second equivalent QP, wherein the instructions that cause the processor to determine the deblocking parameters comprise instructions that cause the processor to:
code information indicative of deblocking offset parameter values;
apply one of the deblocking offset parameter values to the $QP_L$ value to form an offset $QP_L$ value; and
determine the deblocking parameters based on the difference between the offset $QP_L$ value and the first equivalent QP or the second equivalent QP; and
deblock the edge formed between the first block and the second block based on the determined deblocking parameters.

37. The non-transitory computer-readable storage medium of claim 36, wherein the instructions that cause the processor to determine the first equivalent QP or the second equivalent QP comprise instructions that cause the processor to determine the first equivalent QP or the second equivalent QP based at least in part on an element of the first quantization matrix or the second quantization matrix corresponding to a DC component for the first decoded block or the second decoded block.

38. The non-transitory computer-readable storage medium of claim 36, further comprising instructions that cause the processor to entropy decode a first set of quantized transform coefficients to form the first block of quantized transform coefficients, and entropy decode a second set of quantized transform coefficients to form the second block of quantized transform coefficients.

39. The non-transitory computer-readable storage medium of claim 36, further comprising instructions that cause the processor to:
transform and quantize a first original residual block to form the first block of quantized transform coefficients; and
transform and quantize a second original residual block to form the second block of quantized transform coefficients.

40. The method of claim 1, the method being executable on a wireless communication device, wherein the device comprises:
a memory a memory configured to store video data;
a processor configured to execute instructions to process the video data stored in said memory; and
a receiver configured to receive the video data.

41. The method of claim 40, wherein the wireless communication device is a cellular telephone and the video data is received by the receiver and modulated according to a cellular communication standard.

42. The device of claim 21, wherein the device is a wireless communication device, further comprising:
a receiver configured to receive the video data.

43. The device of claim 42, wherein the wireless communication device is a cellular telephone and the video data is received by the receiver and modulated according to a cellular communication standard.

* * * * *